United States Patent
Hong et al.

(10) Patent No.: US 7,228,742 B2
(45) Date of Patent: Jun. 12, 2007

(54) PRESSURE MEASURING SYSTEM FOR VACUUM CHAMBER USING ULTRASONIC WAVE

(75) Inventors: Seung Soo Hong, Daejeon (KR); Yong Hyeon Shin, Daejeon (KR); Kwang Hwa Chung, Daejeon (KR)

(73) Assignee: Korea Research Institute of Standards and Science (KR)

( * ) Notice: Subject to any disclaimer, the term of this patent is extended or adjusted under 35 U.S.C. 154(b) by 0 days.

(21) Appl. No.: 11/418,768

(22) Filed: May 5, 2006

(65) Prior Publication Data
US 2007/0068260 A1    Mar. 29, 2007

(30) Foreign Application Priority Data
Sep. 26, 2005    (KR)    ............... 10-2005-0089163

(51) Int. Cl.
*G01L 11/00*    (2006.01)
(52) U.S. Cl. ............... 73/703; 73/716; 73/718
(58) Field of Classification Search ........... 73/700–756
See application file for complete search history.

(56) References Cited

U.S. PATENT DOCUMENTS

| | | | | |
|---|---|---|---|---|
| 4,574,615 A | * | 3/1986 | Bower et al. ............... | 73/24.01 |
| 4,586,382 A | * | 5/1986 | Sinha ........................... | 73/703 |
| 4,656,864 A | * | 4/1987 | Kraus et al. ............... | 73/24.01 |
| 5,501,113 A | * | 3/1996 | Harrison et al. ........... | 73/865.5 |
| 6,279,378 B1 | * | 8/2001 | Sheen et al. ............... | 73/24.01 |
| 6,393,921 B1 | * | 5/2002 | Grimes et al. ............... | 73/728 |

* cited by examiner

*Primary Examiner*—Edward Lefkowitz
*Assistant Examiner*—Jermaine Jenkins
(74) *Attorney, Agent, or Firm*—Akerman Senterfitt

(57) ABSTRACT

Disclosed is a pressure measuring system for a vacuum chamber, in particular, a pressure measuring system for a vacuum chamber using ultrasonic wave. In this regard, there is provided a pressure measuring system for a vacuum chamber using ultrasonic wave, comprising a vacuum chamber 10 formed with desired vacuum at the inside thereof; ultrasonic wave-emitting means mounted close to an outer peripheral surface of the vacuum chamber 10 for emitting an ultrasonic wave 62 to the inside of the vacuum chamber 10; ultrasonic wave-receiving means for receiving a reflection wave 64 reflected after the striking of the ultrasonic wave 62 emitted from the ultrasonic wave-emitting means to the vacuum chamber; reflection wave-detecting means for detecting the reflection wave 64 from the ultrasonic wave-receiving means; and amplitude-analyzing means for analyzing the amplitude of the reflection wave 64 detected by the reflection wave-detecting means.

11 Claims, 1 Drawing Sheet

PRESSURE MEASURING SYSTEM FOR VACUUM CHAMBER USING ULTRASONIC WAVE

BACKGROUND OF THE INVENTION

1. Field of the Invention

The present invention relates to a pressure measuring system for a vacuum chamber, in particular, to a pressure measuring system for a vacuum chamber using ultrasonic wave.

2. Background of the Related Art

In general, vacuum chambers used in the fabrication process of the semiconductor and the LCD are at low vacuum state in the range of 1 Pa~$10^5$ Pa, and the pressure measurement of such a low vacuum region is performed by using a CDG (capacitance diaphragm gauge).

Accordingly, the vacuum pressure measurement from now on has been performed by mounting such sensor or measuring device in a vacuum chamber. However, when several sensors are to be mounted in such chamber, possibility of the leakage of the vacuum at a connection portion, and the like becomes very high. As a result, the vacuum leakage should be always checked before the use of the vacuum chamber, or measuring the vacuum pressure.

Further, it was required to form a vacuum state in the inside of the chamber, and the like, in which the vacuum pressure sensor or the measuring device was not mounted, after separately mounting it inside of them. In addition, it was impossible to measure the vacuum pressure, if it was impossible to mount such sensor or measuring device, or it was impossible to perform the separate mounting work of it.

SUMMARY OF THE INVENTION

Therefore, the present invention has been made in view of the above problems occurring in the prior art, and a primary object of the present invention to provide a pressure measuring system for a vacuum chamber using the ultrasonic wave, which can minimize the attachment of several sensors mounted through the vacuum chamber to thereby shield the leakage of the vacuum and measure the low vacuum.

The second object of the present invention is to provide a pressure measuring system for a vacuum chamber using the ultrasonic wave, which can easily measure the inside pressure of a place where it is impossible to mount several sensors or the measuring device for measuring the vacuum.

The third object of the present invention is to provide a pressure measuring system for a vacuum chamber using the ultrasonic wave, which is simple to manage and transport, and do not give damage to the device to be measured.

BRIEF DESCRIPTION OF THE DRAWINGS

The above and other objects, features and advantages of the present invention will be apparent from the following detailed description of the preferred embodiments of the present invention in conjunction with the accompanying drawings, in which.

DETAILED DESCRIPTION OF THE PREFERRED EMBODIMENT

Figure 1:
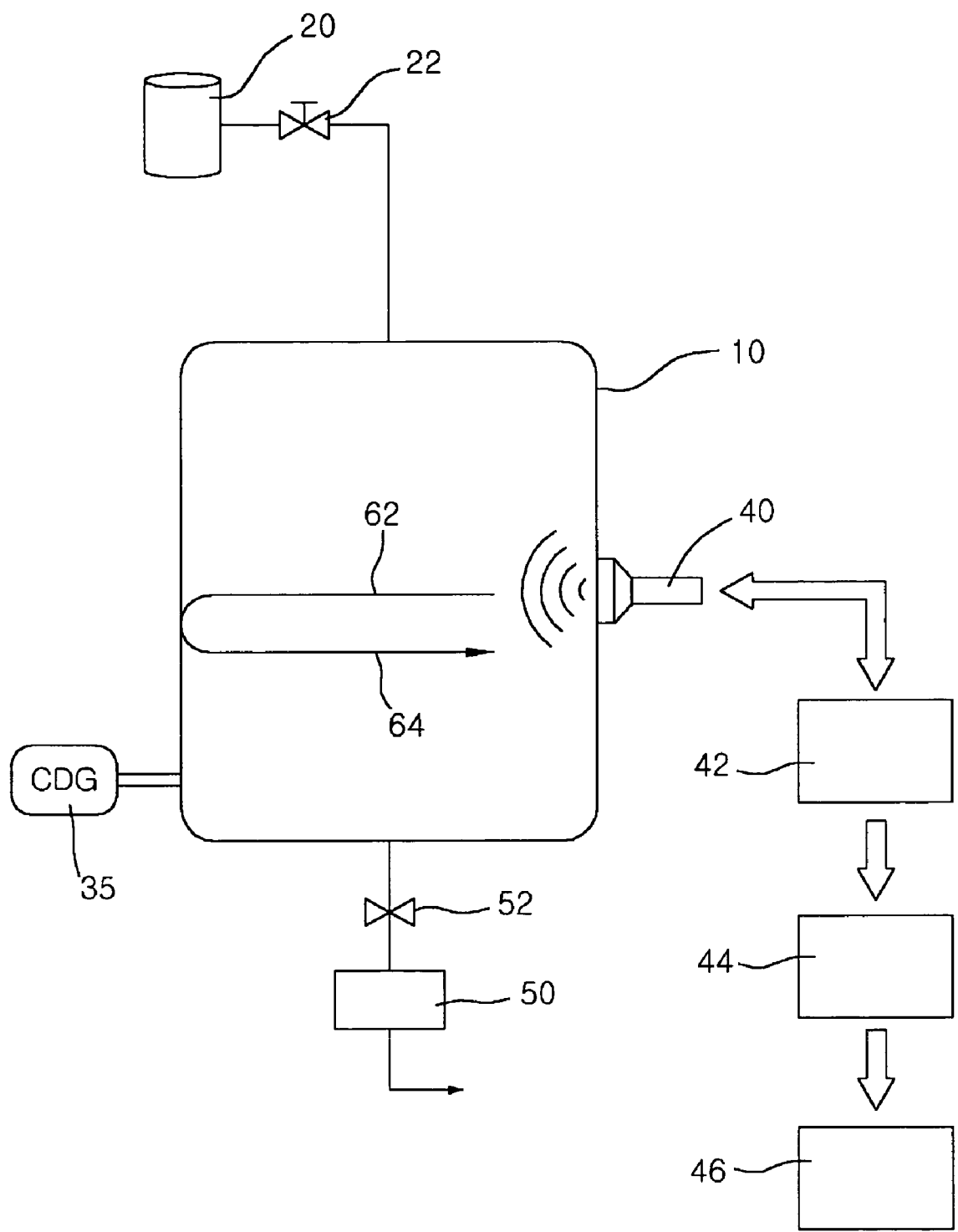
FIG. 1 is a schematic view showing a constitution of a pressure measuring system for a vacuum chamber using ultrasonic wave according to the present invention.

To accomplish the above objects, according to one aspect of the present invention, there is provided a pressure measuring system for a vacuum chamber using ultrasonic wave, comprising a vacuum chamber formed with desired vacuum at the inside thereof; ultrasonic wave-emitting means mounted close to an outer peripheral surface of the vacuum chamber for emitting an ultrasonic wave to the inside of the vacuum chamber; ultrasonic wave-receiving means for receiving a reflection wave reflected after the striking of the ultrasonic wave emitted from the ultrasonic wave-emitting means to the vacuum chamber; reflection wave-detecting means for detecting the reflection wave from the ultrasonic wave-receiving means; and amplitude-analyzing means for analyzing the amplitude of the reflection wave detected by the reflection wave-detecting means.

Further, in the present invention, the ultrasonic wave-emitting means and the ultrasonic wave-receiving means may be preferable to be integrated into a pulse-echo type ultrasonic probe.

Also, it is preferable that the ultrasonic probe can be in close contact with or separated from the outer wall of the vacuum chamber.

In addition, the present invention is most preferable to comprise means for detecting the flight time for detecting the flight time of the ultrasonic wave based on the time difference between the ultrasonic wave-emitting means and the ultrasonic wave-receiving means.

Meanwhile, the vacuum chamber is preferable to be provided with a capacitance diaphragm gauge for measuring the low vacuum pressure.

According to another category of the present invention, there is provided a method of measuring the pressure for a vacuum chamber using ultrasonic wave, comprising a step S10 of forming desired vacuum pressure at the inside of the vacuum chamber; a step S20 of emitting ultrasonic wave to the inside of the vacuum chamber after close contacting with the outer surface of the vacuum chamber; a step S30 of receiving the ultrasonic wave reflected from the vacuum chamber by using the ultrasonic probe; a step S40 of detecting reflection wave reflected from the received ultrasonic wave; and a step S50 of primarily calculating the pressure of the vacuum chamber based on the amplitude of the detected reflection wave.

Further, it is most preferable that the present method further comprises a step S60 of detecting a flight time of the ultrasonic wave based on the difference of time between the step S20 of emitting the ultrasonic wave and the step S30 of receiving the ultrasonic wave; and a step S70 of secondarily calculating the pressure of the vacuum chamber based on the flight time.

Also, according to the present invention, the desired pressure in the vacuum chamber is most preferable to be below 1 Pa. In addition, an intensity of the ultrasonic wave emitted from the step S20 of emitting the ultrasonic wave is most preferable to be equal.

Reference will now be made in detail to the preferred embodiment of the present invention with reference to the attached drawings.

FIG. 1 is a schematic view showing a constitution of a pressure measuring system for a vacuum chamber using ultrasonic wave according to the present invention. As shown in FIG. 1, the pressure measuring system of the present invention comprises approximately a vacuum chamber 10, an ultrasonic probe 40, a signal processing unit, and other assistant unit.

The vacuum chamber 10 has a desired volume at the inside, and the inside thereof is separated from the outside, and is fabricated of a stainless steel for providing sufficient rigidity and preventing the erosion, and the like. It is also provided with a separate view window in the region with which the ultrasonic probe 40 contacts. The view window is fabricated of a tempered glass, and the like.

As for the ultrasonic probe 40, a pulse-echo type probe can be used, in which an ultrasonic wave-emitting means and an ultrasonic wave-receiving means are formed integrally in one assembly. With using such pulse-echo type probe, it becomes possible to measure the vacuum pressure of a place where is required to measure it.

A reflected wave detector 42 is connected to the ultrasonic probe 40. The reflective wave detector 42 is constructed to detect only the reflected wave having a desired frequency from the received ultrasonic signals, several noise signals, and interference signals received by the ultrasonic probe 40. In this regard, the reflected wave detector 42 is provided with a high pass filter or a band pass filter at the inside thereof.

A amplitude analyzer 44 is connected to the reflected wave detector 42 at an input terminal, and an output terminal thereof is connected to a V-P converter 46. The amplitude analyzer 44 is constructed to output the difference between the emitted ultrasonic wave 62 and the detected reflected wave 64 by measuring the amplitude from the detected reflected wave. In this instance, the amplitude analyzer 44 can measure the difference of the amplitude as well as a TOF (Time of Flight) of the ultrasonic wave. This can be calculated from the amplitude delay of the reflected wave.

The V-P converter 46 is one of the signal changer, and is constructed to convert the electric signal (voltage) outputted from the amplitude analyzer 44 into a pressure and to show it. In other words, the shown pressure is represented in proportion as the electric signal, and the method of showing is to represent the pressure by means of numbers (digital type) or by means of graphs (analog type).

As for the assistant devices used in the present invention, a gas storehouse 20, a leak valve 22, a CDG 35, an exhaustion device 50, and a gate valve 52 can be exemplified. Such assistant devices are not requisite elements in the measuring of the low vacuum pressure, however, they can be conveniently used in the use of the vacuum chamber and the preparing process of the measurement.

The gas storehouse 20 is used to store the gas, and the leak valve is used to transport the gas into the inside of the vacuum chamber 10 or to block the transport of it. Such gas storehouse 20 and the leak valve 22 are used to supply the experimental gas for controlling the pressure of the vacuum chamber 10.

The exhaustion device 50 uses a low vacuum rotary pump, more particularly, a dry pump for preventing the back stream of the oil. Such exhaustion device 50 is used to make the inside pressure of the vacuum chamber 10 to be below 1 Pa prior to the measuring of the vacuum pressure. Such pressure level is a boundary valve, which is set for removing the affect of the pressure increase due to outgas at the time of the blocking of the gate valve 52 to the measurement of the pressure.

The CDG 35 is a sensor for detecting the pressure in the range of 1 Pa ~$10^5$ Pa. The CDG is a pressure sensor for examining the initial process in which the vacuum is formed from the atmospheric pressure. Accordingly, the CDG 35 is not used directly in the measuring of the inside pressure of the vacuum chamber.

Hereinafter, the action of the pressure measuring system for the vacuum chamber using ultrasonic wave constructed as described above will be explained.

At first, the gate valve 52 attached to the vacuum chamber 10 is opened, and the exhaustion device 50 is actuated to make the inside pressure of the vacuum chamber 10 be below 1 Pa. The process of forming the vacuum as described above can be seen approximately via the CDG 35.

Next, ultrasonic wave 62 is emitted to the inside of the vacuum chamber after close contacting the ultrasonic probe 40 with the vacuum chamber 10 (especially, the view window). The emitted ultrasonic wave 62 becomes to strike with molecules in the vacuum chamber or be reflected from them with flying in the vacuum chamber 10. Accordingly, the flight time and the amplitude of the ultrasonic wave change depending on the density of the molecules (pressure) in the vacuum chamber 10. Therefore, when the change of the amplitude and the change of the flight time under the vacuum pressure, which have been detected by the experiments performed previously, are represented in a table, the vacuum pressure in the vacuum chamber 10, which is an object to be measured, can be measured.

Then, the reflection wave 64 reflected in the vacuum chamber 10 is received by the ultrasonic probe 40, and passes through the reflection wave detector 42, the amplitude analyzer 44, and the V-P converter 46 in order, to be changed into a pressure value and outputted at last. As a result, the inside pressure of the vacuum chamber 10 can be measured through such process.

While the present invention has been described and shown in conjunction with the vacuum chamber used in the semiconductor fabrication process, and in the LCD fabrication process, and the like, the present invention can also be applied to the vacuum chamber used in several industrial fields in addition to those described above.

Accordingly, according to the preferred embodiment of the present invention, it is possible to minimize the attachment of several sensors mounted through the vacuum chamber to thereby shield the leakage of the vacuum and measure the low vacuum.

Further, it is possible to easily measure the inside pressure of a place where it is impossible to mount several sensors or the measuring device for measuring the vacuum, and the present invention is featured that it is simple to manage and transport, and do not give damage to the device to be measured.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A pressure measuring system for a vacuum chamber using ultrasonic wave, comprising:
    a vacuum chamber formed with desired vacuum at the inside thereof;
    ultrasonic wave-emitting means mounted close to an outer peripheral surface of the vacuum chamber for emitting an ultrasonic wave to the inside of the vacuum chamber;

ultrasonic wave-receiving means for receiving a reflection wave reflected after the striking of the ultrasonic wave emitted from the ultrasonic wave-emitting means to the vacuum chamber;

reflection wave-detecting means for detecting the reflection wave from the ultrasonic wave-receiving means; and amplitude-analyzing means for analyzing the amplitude of the reflection wave detected by the reflection wave-detecting means.

2. The pressure measuring system for the vacuum chamber using ultrasonic wave according to claim 1, wherein the ultrasonic wave-emitting means and the ultrasonic wave-receiving means are integrated into a pulse-echo type ultrasonic probe.

3. The pressure measuring system for the vacuum chamber using ultrasonic wave according to claim 2, wherein the ultrasonic probe is in close contact with or separated from the outer wall of the vacuum chamber.

4. The pressure measuring system for the vacuum chamber using ultrasonic wave according to claim 1, further comprising means for detecting the flight time for detecting the flight time of the ultrasonic wave based on the time difference between the ultrasonic wave-emitting means and the ultrasonic wave-receiving means.

5. The pressure measuring system for the vacuum chamber using ultrasonic wave according to claim 1, wherein the vacuum chamber is provided with a capacitance diaphragm gauge for measuring the low vacuum pressure.

6. A method of measuring the pressure for a vacuum chamber using ultrasonic wave, comprising the steps of:

forming desired vacuum pressure at the inside of the vacuum chamber (S10);

emitting ultrasonic wave to the inside of the vacuum chamber 10 after close contacting with the outer surface of the vacuum chamber (S20);

receiving the ultrasonic wave reflected from the vacuum chamber by using the ultrasonic probe (S30);

detecting reflection wave reflected from the received ultrasonic wave (S40); and primarily calculating the pressure of the vacuum chamber based on the amplitude of the detected reflection wave (S50).

7. The method of measuring the pressure for the vacuum chamber using ultrasonic wave according to claim 6, wherein the desired pressure in the vacuum chamber is below 1 Pa.

8. The method of measuring the pressure for the vacuum chamber using ultrasonic wave according to claim 6, wherein an intensity of the ultrasonic wave emitted from the step S20 of emitting the ultrasonic wave is equal.

9. The method of measuring the pressure for the vacuum chamber using ultrasonic wave according to claim 6, further comprising the steps of:

detecting a flight time of the ultrasonic wave based on the difference of time between the step S20 of emitting the ultrasonic wave and the step S30 of receiving the ultrasonic wave (S60); and secondarily calculating the pressure of the vacuum chamber based on the flight time (S70).

10. The method of measuring the pressure for the vacuum chamber using ultrasonic wave according to claim 9, wherein the desired pressure in the vacuum chamber is below 1 Pa.

11. The pressure measuring system for the vacuum chamber using ultrasonic wave according to claim 9, wherein an intensity of the ultrasonic wave emitted from the step S20 of emitting the ultrasonic wave is equal.

* * * * *